United States Patent
Al Ghatta

(10) Patent No.: US 6,228,302 B1
(45) Date of Patent: *May 8, 2001

(54) PROCESS FOR THE PRODUCTION OF POLYESTER RESINS

(75) Inventor: Hussain Al Ghatta, Fiuggi (IT)

(73) Assignee: Sinco Engineering S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/898,967

(22) Filed: Jul. 23, 1997

(30) Foreign Application Priority Data

Aug. 1, 1996 (IT) .............................................. MI96A1660

(51) Int. Cl.$^7$ ..................................................... B29C 47/88
(52) U.S. Cl. ................... 264/143; 264/211.12; 264/237; 264/348; 525/437
(58) Field of Search ............................. 264/141, 177.19, 264/211.12, 237, 348, 347, 143; 525/437

(56) References Cited

U.S. PATENT DOCUMENTS

| | | | |
|---|---|---|---|
| 4,064,112 | * 12/1977 | Rothe et al. | 260/75 |
| 4,132,707 | * 1/1979 | Borman | 528/273 |
| 4,147,738 | * 4/1979 | Borman | 260/860 |
| 4,161,578 | * 7/1979 | Herron | 528/272 |
| 4,224,264 | 9/1980 | Ort et al. | |
| 4,957,945 | * 9/1990 | Cohn | 521/182 |
| 4,963,644 | * 10/1990 | Duh | 528/272 |
| 5,090,134 | 2/1992 | Russemeyer et al. | |
| 5,243,020 | * 9/1993 | Ghisolfi | 528/272 |
| 5,334,669 | * 8/1994 | Ghisolfi | 525/437 |
| 5,338,808 | * 8/1994 | Ghisolfi | 525/437 |
| 5,510,454 | 4/1996 | Stouffer et al. | |
| 5,663,290 | * 9/1997 | Heise et al. | 528/481 |
| 5,670,606 | * 9/1997 | Stouffer et al. | 528/272 |
| 5,714,571 | 2/1998 | Al Ghatta et al. | |
| 5,730,913 | * 3/1998 | Stouffer et al. | 264/8 |
| 5,739,269 | * 4/1998 | Ghatta et al. | 528/492 |

FOREIGN PATENT DOCUMENTS

| | | |
|---|---|---|
| 1 095 677 | 2/1969 | (DE) . |
| 0422282 A1 | 10/1989 | (EP) . |
| WO 93/14922 | 8/1993 | (WO) . |
| WO 97/23543 | 7/1997 | (WO) . |

OTHER PUBLICATIONS

Macromolecular Physics, vol. II, Bernhard Wunderlich, p. 161, 176, 215, and 241–244, 1976.*

The Crystallization of Poly(ethylene terephthalate) and Related Copolymers; J.B. Jackson and G.W. Longman, SPX 27th Annual Technical Conference, Chicago, May 1969.

Morphology and Melting Behavior of Semicrystalline Poly (ethylene terephthalate). I. Isothermally Crystallized PET; G. Groeninickx, H. Reynaers, H. Berghmans, and G. Smets; Journal of Polymer Science: Polymer Physics Edition, vol. 18, 1311–1324 (1980).

* cited by examiner

Primary Examiner—Jan H. Silbaugh
Assistant Examiner—Mark Eashoo
(74) Attorney, Agent, or Firm—Cook, Alex, McFarron, Manzo, Cummings & Mehler, Ltd.

(57) ABSTRACT

Process for the crystallization of aromatic polyester resins having IV between 0,5 and 0.7 dl/g wherein the resin is extruded in the form of a strand at extruder exit or the chips obtained by cutting the strand are crystallized maintaining them at temperature between 160° C. and 220° C. for sufficient time to obtain a crystallized product wherein the DSC curves do not show the presence of practically any premelt peaks.

10 Claims, 3 Drawing Sheets

PROCESS FOR THE PRODUCTION OF POLYESTER RESINS

BACKGROUND OF THE INVENTION

The present invention is directed to an improved process for the production of aromatic polyester resins.

The aromatic polyester resins employable in applications such as moulding, injection and similar operations need high molecular weights corresponding to values of intrinsic viscosity (IV) generally superior to 0.65–0.75 dl/g. Resins for fibers and film on the contrary have lower IV values, between ca. 0.65 and 0.70 dl/g.

The preparation of the resins is carried out by polycondensation of an aromatic dicarboxylic acid, normally terephthalic acid or its alkyl diesters with an aliphatic glycol at temperature and pressure conditions such as to obtain a resin with final IV values between ca. 0.4 and 0.7 dl/g.

The resin for moulding and similar operations is subjected to polycondensation treatment in the solid state (SSP) with the aim of raising the IV to desired values.

Before the SSP treatment, the resin is subjected to crystallization in conditions such as to obtain a level of crystallinity (35–40%) sufficiently high to allow the conduction of the SSP stage without the inconvenience caused by sticking of particles, which under severe conditions can lead to plant stoppage.

The crystallization treatment is realized in fluid bed reactors or similar equipment, by heating the polymer between ca. 160° C. and 220° C.

The SSP treatment is normally carried out at temperatures between 180° and 220° C. Higher temperatures, which could allow a remarkable increase in the polycondensation kinetic due to particle sticking phenomen caused by inadequate crystallization of the polymer, are not practically employable.

It is known to the inventor that the crystallization speed of polyester resins with relatively high intrinsic viscosity (higher than 0.5% dl/g) is by far much lower than the crystallization speed of resins with low IV (lower than 0.4 dl/g). It is also known to the inventor that by crystallization from the melting of resin at low IV, it is possible to obtain crystallized resins where the DSC thereof curves do not show presence of premelt peaks.

DETAILED DESCRIPTION OF THE PRESENTLY PREFERRED EMBODIMENTS

Figure 1:
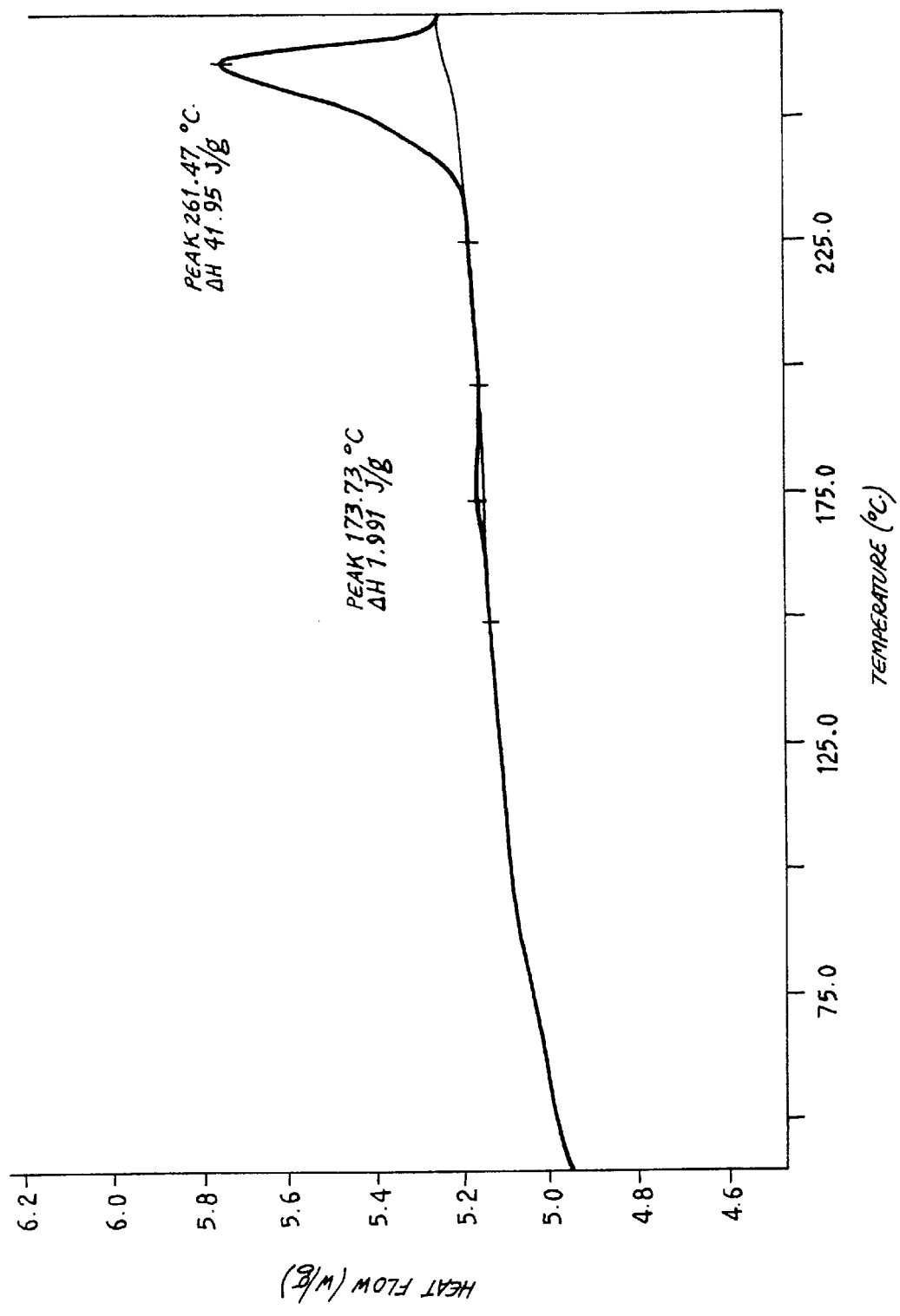
FIG. 1 is a DSC curve of chips maintained at the extruder exit in Example 1 of the present invention.

It has now been unexpectedly found that it is possible to crystallize from the melt resins with IV values higher than 0.4 and generally between 0.55 and 0.7 dl/g, and obtain resins with crystalline organization such that in the DSC curves they do not show premelt peaks, or, if they are present, they have fusion enthalpy lower than 5 J/g. The above indicated result is obtained by extruding the resin in the form of a strand and subjecting the strand at the extruder exit to crystallization, maintaining it at temperature between 150° and 220° C. for sufficient time to obtain the desired level of crystallinity and crystalline organization indicated above.

This result is much more surprising if it is taken into account that, for the crystallization of polyester resins with IV above 0.55 dl/g cooled from the melt down to room temperature and then brought to temperature suitable for crystallization (150°–220° C.), crystallized resins are not obtained where the corresponding DSC curves practically do not show presence of premelt peaks.

In the case of polyethylene terephthalate (PET) obtained according to the process of the present invention process, where the premelt peak temperature values are around 260°–262° C., there is practically no presence of premelt peaks.

The crystallized PET thus obtained can be treated in the next SSP phase at notably higher temperatures than those normally employed for PET obtained by conventional crystallization processes. Consequently, the duration of the SSP treatment is anotably reduced.

The crystallization of the polymer carried out according to the process of the present invention allows attainment of not only a polymer with adequate crystalline organization, but also a notable simplification of resin preparation process.

In fact, it is not necessary to cool the polymer to room temperature in order to realize the pelletizing phase and then heat the chips to the crystallization temperature.

The polyester resin to which the process of the invention is applied has an intrinsic viscosity normally above 0.55 dl/g and generally between 0.55 and 0.70 dl/g. The resin can be added with a dianhydride of a tetracarboxylic acid, preferably aromatic, for example pyromellitic dianhydride which is employed in quantities from 0.01 to 2% by weight.

The crystallization temperature is preferably between 170° C. and 200° C. with a duration of 5 to 30 minutes.

The crystalline resins obtained by the process of the present invention are subjected to polycondensation bins the solid state at temperatures higher than 160° C. and generally between 170° C. and 230° C. for sufficient time to obtain the desired increase in intrinsic viscosity.

The crystallization process of the resin and subsequently the SSP treatment of the same can be carried out continuously. On exit from the extruder, the strand is maintained at a temperature suitable for crystallization and then cut into chip form. While still hot, the chips are conveyed to the SSP stage. Alternatively, or on exit from the extruder, the strand is cut while it is at crystallization temperature or higher, and the chips are subsequently crystallized and then conveyed to SSP phase. The chips are preferably transferred to the SSP stage while they are still at the crystallization temperature or slightly lower (5–20° C.), after a heat-setting treatment at a temperature between 160° C. and 200° C. for duration a of 10–60 minutes.

The crystallization stage and strand cutting are conducted in an inert gas atmosphere utilizing for example recycled nitrogen from the SSP stage, which, being at sufficiently high temperature, permits the utilization of its heat for heating during the crystallization stage.

The polyester resins, to which the process of the present invention is applied, are obtained by polycondensation according to known methods of aromatic dicarboxylic acids, preferably terephthalic acid and its dialkaline diesters such as for example dimethyl terephthalate, with diols with 1–10 carbon atoms such as ethylene glycol, butylene glycol, 1,4 cyclohexane dimethylol.

Polyethylene terephthalate and its ethylene terephthalic copolymers in which up to ca. 15% of terephthalic acid units are substituted by units deriving from isophthalic acid and/or naphthalene dicarboxylic acids, polybutylene terephthalate, polyalkylene naphthalenates and their copolymers, are the preferred resins.

The resins obtained with the process of the present invention find application in the preparation of formed articles according to the known moulding, blowing, extrusion, extrusion and injection blow-moulding, thermoforming techniques, or other techniques employed in the field of plastic materials.

The resins with viscosity higher than 0.5 dl/g, and generally between 0.5 and 0.7 dl/g, not yet subjected to SSP treatment and wherein the DSC curves of the same do not show presence of premelt peaks or, if present, have fusion enthalpy inferior to 5 J/g, are new products.

The following examples are provided to illustrate and not to limit the present invention.

The intrinsic viscosity is determined in a solution of 0.5 g of polymer in 100 ml of a mixture 60/40 by weight of phenol and tetrachloroethane at 25° C. according to ASTM D 4603-86.

The DSC curves were obtained employing a heating speed of 10° C./min.

EXAMPLE 1

PET with IV=0.60 dl/g coming from a polycondensation stage in the melt, is extruded to form a strand which on exit from the extruder is kept at 185° C. for 10 minutes in a nitrogen atmosphere and then cut.

The DSC curve (FIG. 1) of the chips thus obtained shows a peak of 261° C. and a small premelt peak at 173° C. with Δ H of 1.991 J/g.

The chips were then fed to a polycondensation reactor in solid state heated to 230° C. and maintained at this temperature for sufficient time to obtain the desired increase in viscosity.

EXAMPLE 2

The same procedure as for example 1, with the difference that COPET containing 2% of units of isophthalic acid was used.

The DSC curve of the polymer obtained did not present premelt peaks.

EXAMPLE 3

Figure 2:
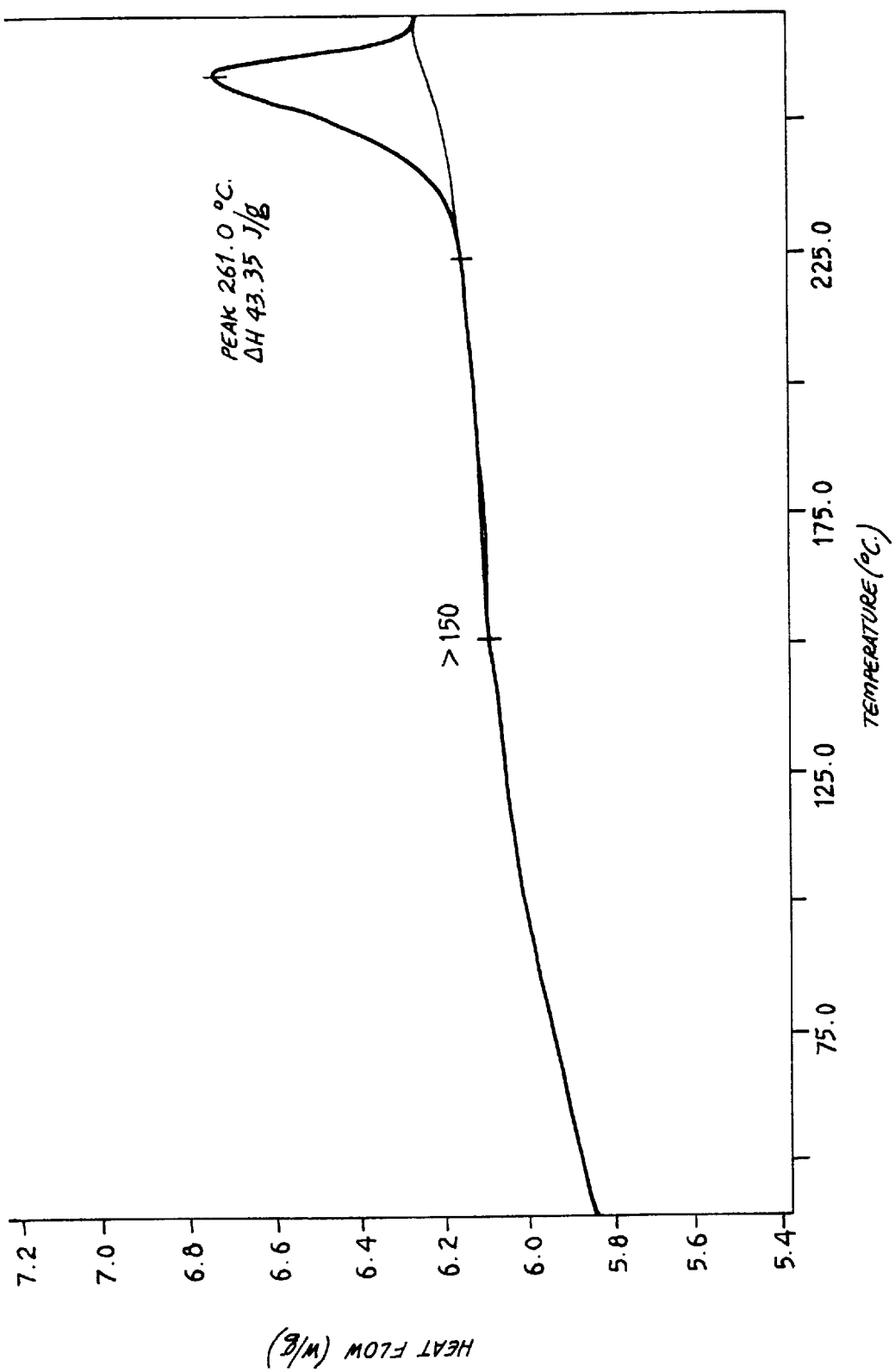
FIG. 2 is a DSC curve of the polymer obtained in Example 3 of the present invention.

The same procedure as for example 2 with the difference that the strand was maintained at 180° C. for 20 minutes. The DSC curve of the polymer obtained is shown in FIG. 2.

EXAMPLE 4

Figure 3:
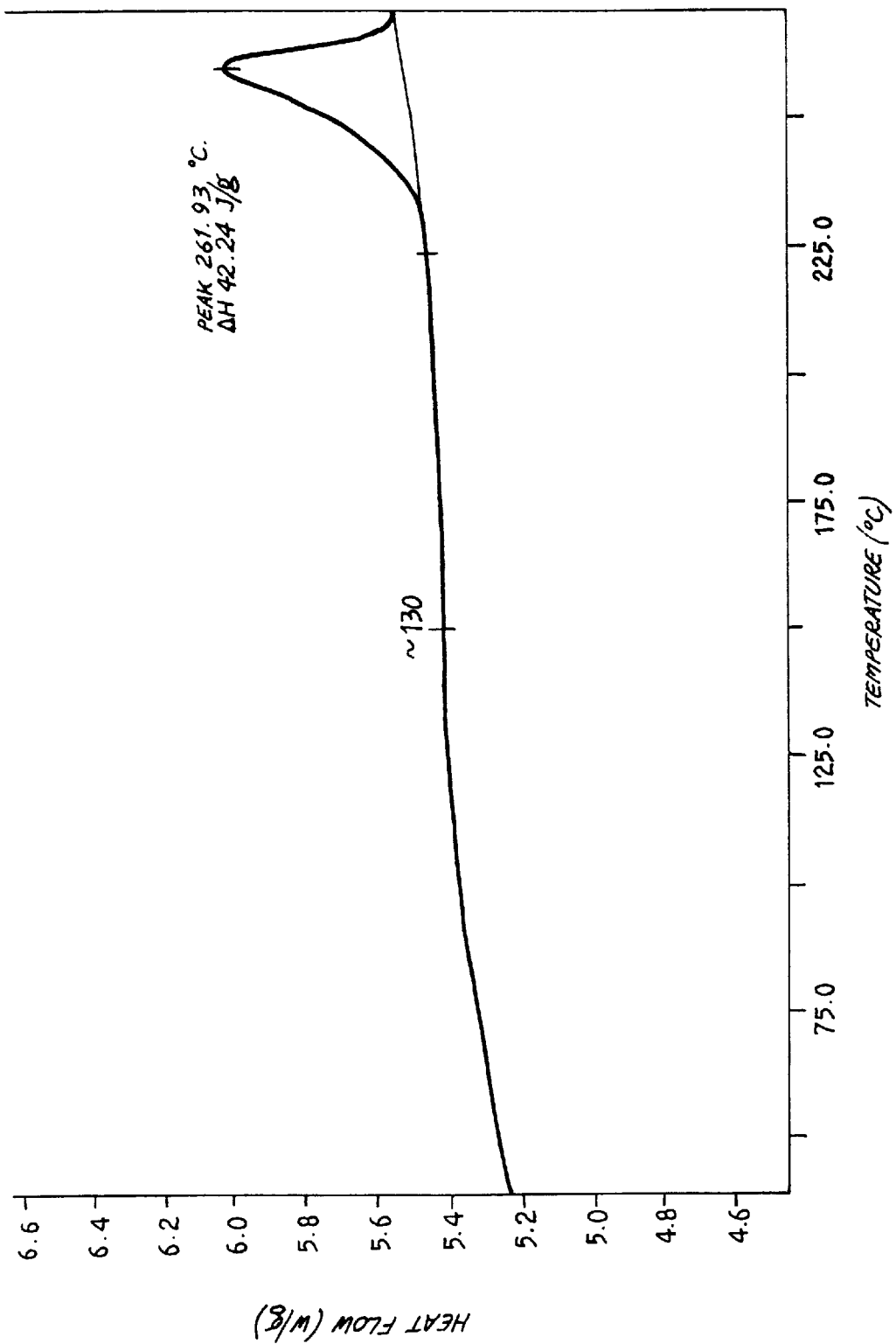
FIG. 3 is a DSC curve of the polymer obtained in Example 4 of the present invention.

The same procedure as for example 1, with the difference that the strand was maintained at 175° C. for 20 minutes. The DSC curve is reported in FIG. 3.

What is claimed is:

1. A process for the crystallization of a polyester resin with an intrinsic viscosity higher than 0.5 dl/g added with a dianhydride of a tetracarboxylic acid, comprising the steps of:

extruding the resin and dianhydride in the form of a strand;

cooling the strand with an inert gas at an extruder exit to a temperature between 150°–220° C., and maintaining the strand at said temperature for a sufficient time to obtain a crystallized strand wherein the DSC curves of the crystallized stand show no presence of premelt peaks, or if present, the peaks have a fusion enthalphy lower than 5 J/g.

2. Process for the preparation of polyester resins with an intrinsic viscosity between 0.55–0.70 dl/g wherein the strand is subjected to crystallization according to the process of claim 1 and then subjected to polycondensation in the solid state.

3. Process according to the claim 2 wherein the resin is added with a dianhydride of a tetracarboxylic acid in quantity of 0.05 to 2% by weight.

4. Process according to claim 3 wherein the dianhydride is pyromellitic dianhydride.

5. A process for the crystallization of a polyester resin with an intrinsic viscosity higher than 0.5 dl/g added with a dianhydride of a tetracarboxylic acid, comprising the steps of:

extruding the resin and dianhydride in the form of a strand;

cooling chips obtained by cutting the strand to a temperature between 150°–220° C., and maintaining said chips at said temperature for a sufficient time to obtain crystallized chips wherein the DSC curves of the crystallized chips show no presence of premelt peaks, or if present, the peaks have a fusion enthalphy lower than 5 J/g.

6. Process for the preparation of polyester resins with an intrinsic viscosity between 0.55–0.70 dl/g wherein the chips is subjected to crystallization according to the process of claim 5 and then subjected to polycondensation in the solid state.

7. Process according to claim 6 wherein the crystallized chips are passed to the solid state polycondensation treatment while they are still at a crystallization temperature or a slightly lower temperature, after a heat-setting treatment of the chips at a temperature between 160° and 200° C.

8. Process according to claim 7 wherein the resin is selected from the group consisting of polyethylene terephthalate, copolyethylene terephthalates containing up to 20% by moles of units deriving from isophthalic acid and/or naphthalene dicarboxylic acids and polybutylene terephthalate.

9. Process according to claim 7 wherein the resin is added with a dianhydride of a tetracarboxylic acid in a quantity of 0.05 to 2% by weight.

10. Process according to claim 9 wherein the dianhydride is pyromellitic dianhydride.

* * * * *